United States Patent [19]

Babasade

[11] Patent Number: 4,558,196

[45] Date of Patent: Dec. 10, 1985

[54] INDUCTION SMOKE REGENERATOR AND METHOD FOR PRODUCING NATURAL SMOKE

[76] Inventor: Wolfgang Babasade, 405 Knierim Pl., New Milford, N.J. 07646

[21] Appl. No.: 455,891

[22] Filed: Jan. 5, 1983

[51] Int. Cl.[4] .......... H05B 5/00; A23B 1/30; A01J 11/00
[52] U.S. Cl. .............. 219/10.51; 219/10.57; 219/10.65; 219/10.41; 426/314; 99/468; 99/481; 99/476
[58] Field of Search .......... 219/10.51, 10.57, 10.49 R, 219/10.65, 10.41; 426/314, 315; 99/467, 471, 473, 475, 476, 481, 482

[56] References Cited

U.S. PATENT DOCUMENTS 3,861,292 1/1975 Gilliland et al. .............. 99/476
3,871,353 3/1975 Haug .................. 99/482 X
3,969,996 7/1976 Huang et al. .............. 99/476

Primary Examiner—C. L. Albritton
Assistant Examiner—Marvin M. Lateef
Attorney, Agent, or Firm—W. Patrick Quast

[57] ABSTRACT

An improved apparatus and method for smoke treating food products includes an inductively heated, hollow member which is raised to a sufficiently high temperature so as to vaporize an injected water/liquid smoke mixture. This happens when the liquid smoke mixture contacts the walls of the heatable, hollow member. Control apparatus is provided for regulating the amount of liquid smoke flowing to the mixing device; as well as providing for injecting air to carry the gaseous smoke away for subsequent use in the smoke treating process. The invention also provides for a self cleaning of the smoke generating tube member.

8 Claims, 4 Drawing Figures

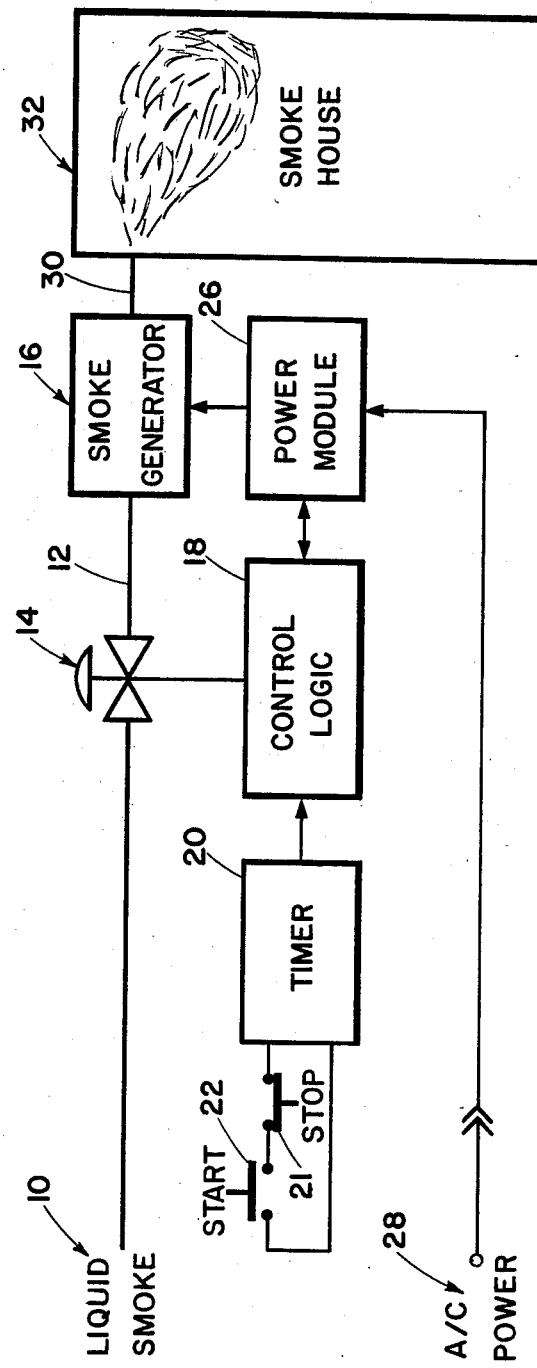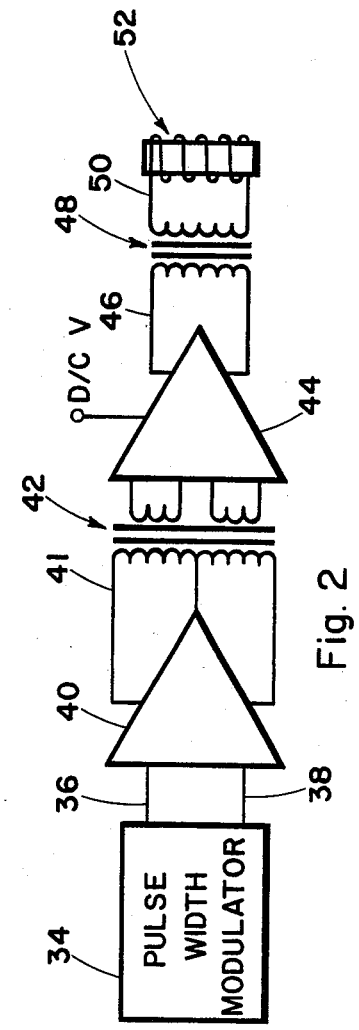

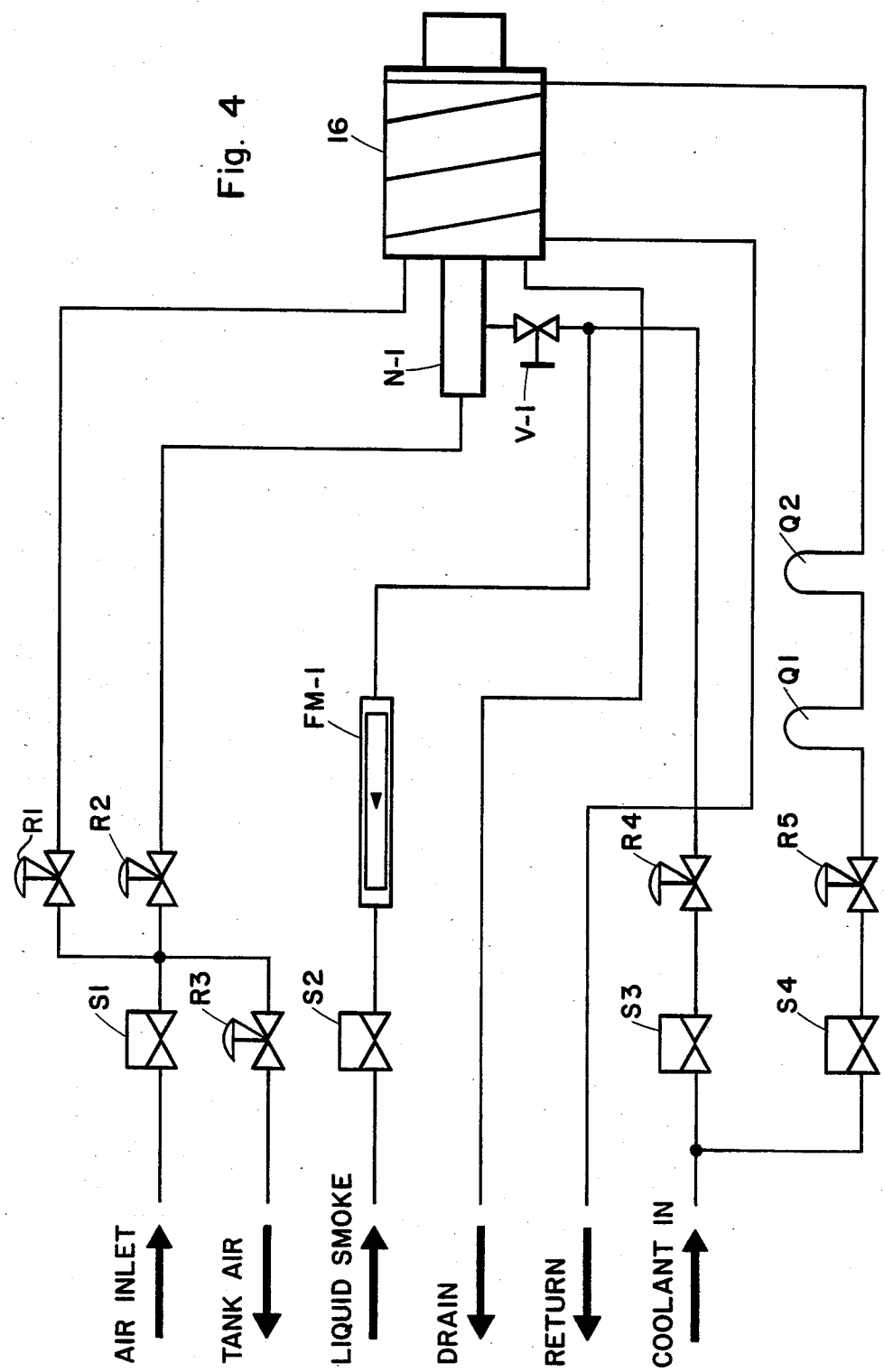

4,558,196

INDUCTION SMOKE REGENERATOR AND METHOD FOR PRODUCING NATURAL SMOKE

BACKGROUND OF THE INVENTION

1. Field of the Invention

This invention relates generally to the generation of natural smoke and more particularly to an improved means and methodology for generating smoke for subsequent use in smoke treating items particularly food products.

2. Description of the Prior Art

The inventor is aware of perhaps three processes which are presently employed in smoke treating various items, including food products. These include: the burning of wood chips or sawdust which emit natural smoke; atomizing liquid smoke concentrate and mixing with water for spraying into the smoke room which is kept at an elevated temperature; and, spraying liquid smoke onto a heated plate, which vaporizes it into the gaseous state.

The natural, wood burn technique, albeit potentially the best process, is generally inconsistent in its results. This can be attributed to the variation in quality and moisture in the wood and the imprecise nature of the method. Further, it is time consuming and requires frequent cleaning to remove ash and cinders from the combustion chambers.

The liquid smoke, water-mix method reduces the inconsistency problem but is inadequate for treating certain food products such as cheeses, fish, potato chips, etc. This is due primarily to the likelihood of spotting of the product, by water droplets formed in the treating chamber.

Spraying liquid smoke onto the heated plate is a messy process and eventually results in a caking of the plate with decreasing efficiency. Further, the power requirements are extremely high, making it a less desirable approach in view of increasing energy costs.

Further, the last two techniques are considered "artificial" treatments and preclude subsequent labelling of the product as "naturally smoked" - a perceived marketing advantage.

Therefore, it is a primary object of this invention to provide an apparatus and process for smoke treating various items including particularly food products, which provide the consistency afforded by liquid smoke, but which avoids the problems heretofore experienced by such techniques.

It is a further object of this invention to provide an apparatus for smoke treating food products which is energy efficient.

It is still another object of this invention to provide an apparatus which allows retention of the "natural smoke" labelling of products.

It is yet another object of this invention to provide for ready, self cleaning of the gaseous smoke - generating surface.

SUMMARY OF THE INVENTION

Towards the accomplishment of these and other objects which will become more apparent after a reading of the following description and study of the accompanying drawings, there is disclosed an improved apparatus and method for smoke-treating items including food products which comprises a source of liquid smoke and means for mixing the smoke with water in a predetermined ratio. The water-liquid-smoke mixture is injected into the interior of a heatable, hollow member, the latter inductively heated to a sufficiently high temperature whereby the injected water-liquid-smoke mixture is vaporized into a gaseous smoke state when it contacts the wall of the heatable, hollow member. The invention includes means for controlling the amount of liquid smoke flowing towards the mixing device. Further, means are provided for injecting air into the interior of the heatable hollow member for carrying the gaseous smoke away for subsequent use in the smoke treating process. The invention allows for the heating of the hollow member to a point at which self-cleaning occurs.

BRIEF DESCRIPTION OF THE DRAWINGS

A better understanding of the present invention will be had from the following description and the accompanying drawings which include:

FIG. 1, a block diagram of the present smoke generating system;

FIG. 2, a schematic diagram of the power module section of FIG. 1;

DESCRIPTION OF THE PREFERRED EMBODIMENT

Figure 3:
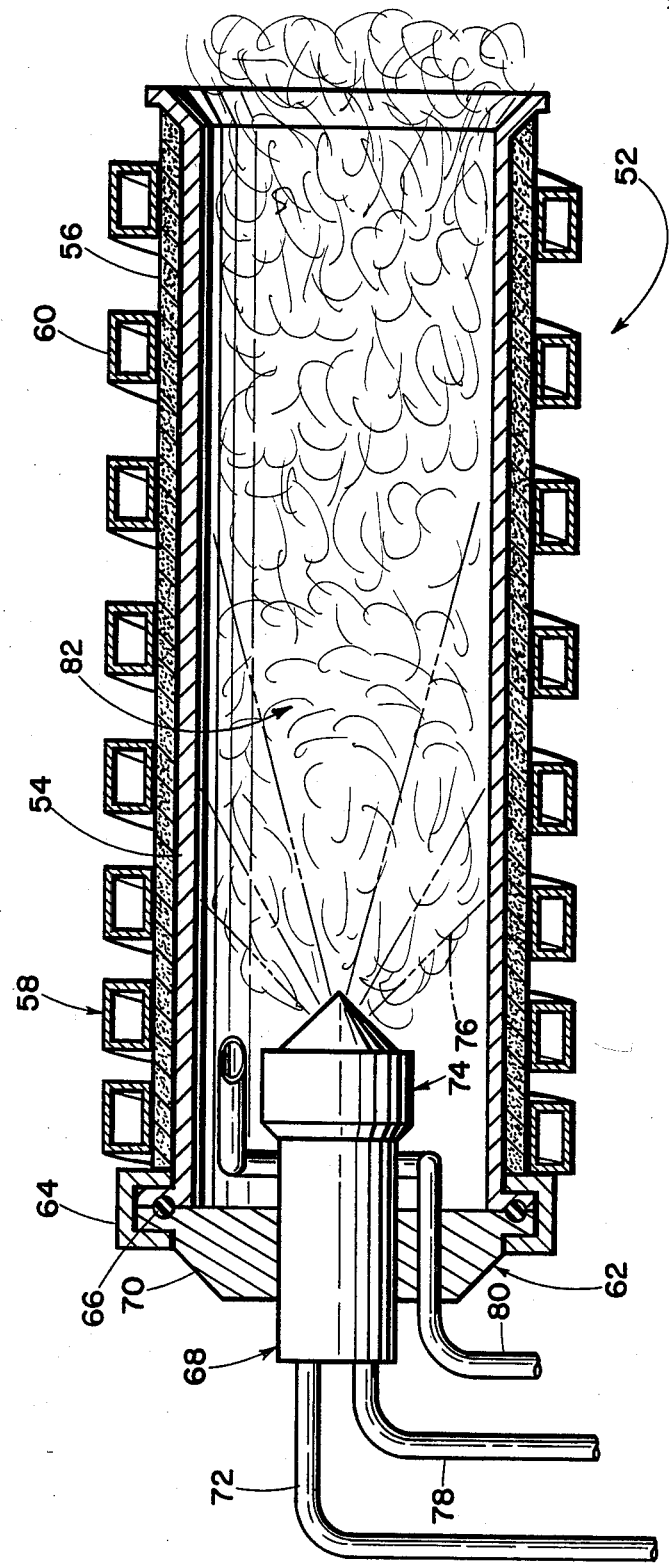
FIG. 3, a side, elevational view in section of the heatable, hollow member with the inductive coil in place; and, FIG. 4, a functional diagram showing the air and liquid smoke connections to the inductive coil portion of the invention.

Referring now to the functional diagram depicted in FIG. 1, a source of liquid smoke 10 is connected by the output 12 of flow control valve 14 to the atomizing nozzle of a smoke generating tube 16. Control logic 18 responding to commands from timer 20 regulates the operation of valve 14 and others as described hereinafter when power is turned on by switch 22. An emergency stop switch 24 is provided to allow the operator to interrupt the cycle as required. In addition to various valves controlled by logic 18, a power module 26 is likewise suitably controlled by the logic 18. The power module 26 connects a source of AC power 28 to the smoke generator 30 for purposes of effecting the present invention. Gaseous smoke generated by 16 is fed via tubing 30 to a smoke house 32 where food products and the like can be treated.

FIG. 2 depicts in expanded circuit form, the power module 26 of FIG. 1. It is seen to include pulse width modulator, circuitry 34 which has as its cornerstone, an integrated circuit chip, such as Ferranti's Co. i.c.#ZN1066E. Connected to the chip are various resistors and capacitors and variable resistors necesary to provide the desired pulse frequency and width on outputs 36 and 38. The manufacturer specifications for the device can be referred to in selecting these components. Outputs 36 and 38 are complementary outputs which in turn are connected to buffer driver amplifier 40 which is connected to the primary 41 of coupling transformer 42. The secondaries of the transformer drive the main power inverter circuit 44 which is a DC to AC half bridge device. The output of the inverter is connected to the primary 46 of a ferrite core output transformer 48. The secondary 50 of the latter is connected to the induction coil of smoke generating device 52.

The main power inverter 44 has an output power capacity, excluding efficiencies, of:

$$P_{max} = \frac{E_{dc} \times I_{cmax}}{2}$$

for a DC voltage of approximately 310 volts fed to the inverter, and for a typical maximum $I_c$ of 20 amperes, the maximum power deliverable is 3.1 KW. In fact, the actual R.F. power applied to the induction coil is about 2.5 KW at 50 KHZ.

The power inverter circuit includes 2 power transistors manufactured by the Westinghouse Corporation and designated D60T. The transformer 48, as noted above is a ferrite core transformer. It includes a primary winding of 10 turns of ⅛" square copper tube; a 4 turn, ¼" square (optional round) copper tube, water cooled; and, a core such as Ferrox Cube Corporations's U core PN#1F5-3C6 or Indiana General Company's IR8117. The secondary of the transformer is connected to the induction coil forming a part of the smoke regenerating means 52. This is described particularly in FIG. 3.

The smoke regenerating means 52 is shown to include a heatable hollow member 54 such as a cylindrical stainless steel tube. The cylinder for example, would be approximately 12" in length and have an outside diameter of 2" and an inside diameter of 1¾". Surrounding the cylindrical tube is a ceramic or quartz sleeve 56 for minimizing the heat loss from the tube 54. The sleeve extends the length of the tube. Wound around the sleeved tube is a solenoid type, induction coil 58. For the design described, this is approximately 8 turns with the spacing between each successive turn increasing, going towards the open end. The coil in this way creates a maximum flux density in the first 50 percent of the tube. The coil comprises a ¼" square (optional round) tubing which is the continuum of the secondary winding 50 of the transformer 48. The combined secondary winding coil winding is connected to the coolant system with water pumped through the hollow coils.

Positioned at one end of the tube is a spray nozzle-mounting configuration 62. This is clamped to the one end of the heatable member by clamp ring 64. Interposed between the mating surfaces of the configuration 62 and the end of the tube 54 is a suitable sealing gasket 66.

The spray nozzle configuration 62 includes an atomizing nozzle 68 centrally disposed in a mounting member 70 which in turn locates the nozzle substantially along the longitudinal axis of the tube. Connected to the atomizing nozzle is stainless steel tubing 72 which connects the nozzle to the liquid smoke/water mixture. The atomizing nozzle head 74, manufactured by Delavan Co., their model #60615, develops a 50 to 100 micron mist 76 of the liquid smoke and water. This is dispersed into the center of the tube and against the inner walls thereof. The majority of the liquid smoke impacts the inside wall of the tube within the first 8" from the nozzle end.

Also connected to the nozzle member is tubing 78. This supplies controlled air pressure (5 to 10 PSI) to the atomizing nozzle for atomizing the liquid smoke/water.

Means for conducting a controlled flow of boost air to the smoke generator include tubing 80. This passes through the mounting member 70 terminating in a circumferentially disposed tubing inside of the cylinder member and surrounding, at least in part, the nozzle 74. The tubing extends a distance in the cylinder parallel to the longitudinal axis of the tube. The boost air is introduced into the pipe with the result that a swirling air pattern from the point of entrance to the exhaust is created. This, in turn, allows the force of the boost air to flow adjacent to the side wall of the tube, spreading out the accumulated liquid smoke mist more uniformly over the full length of the tube and allowing more rapid vaporization of the liquid smoke from better distribution. The boost air pressure is on the order of 20 to 40 PSI.

Referring now to FIG. 4, an understanding of the various interconnections appropriate for the system can be obtained. Generally, all wetted parts are 316 stainless steel in accordance with the Food and Drug Administration regulations. The solenoid valves are the Asco - Red Hat type, catalogue #8262C13; the pressure control valves are R1-R5 manufactured by the Norgren Co., Model #R06-221-NNEA; the flow meter, FM-1, is manufactured by Wallace & Tiernan, their Model #NPXB-947; and, valve V-1 manufactured by the Whitey Co. #SS-2JBA2.

The air inlet is connected to a pressurized air source which in turn is connected through solenoid S1 to the air pressure control valves R1, R2, and R3. S1 is energized when the on switch 22 is activated. As noted above, R1 and R2 regulate the pressure to the boost tubing and the atomizing nozzle respectively. R3 provides controlled air pressure to the external liquid smoke holding tank, from which the liquid smoke is displaced under pressure (25-50 PSI) back through solenoid S2.

S2 is energized after the timer (20 in FIG. 1) passes an initial time delay sufficient to allow the induction coil to elevate the temperature of the smoke generating tube. At that point, S2 closes allowing liquid smoke to travel from the tank through the flow meter FM-1 (at the desired rate) and thence to the atomizing nozzle through the valve, V-1. Use of the valve by the operator while monitoring the flow meter, allows the operator to control the flow of liquid smoke to the nozzle. The time that such flow takes is controlled by a second cycle in the timer 20. Throughout the first and second cycle power is being supplied to the induction coil of the smoke generator by the power module 26.

Since the liquid smoke can dry and cake up inside the nozzle, which is exposed to a great amount of heat even after the system is shut off, there is included an automatic purging system which allows for passing water through V-1 and the nozzle at the end of the liquid smoke spray cycle. An additional sequence to the timer controls the length of the purge. This is initiated when the second cycle (smoke cycle) ends.

The water is pumped through the solenoid S-3 and R4, and then V-1 and the nozzle dissolving any liquid smoke remaining there which is then atomized by the atomizing air onto the walls of the tube where it vaporizes harmlessly.

Throughout the operation, cooling water is supplied at the "coolant in" port regardless of operation of the smoke generator. Circuitry not shown is provided which indicates a failure of coolant flow, automatically shutting down the system and providing an appropriate warning display. Solenoid S-4 can be either wired so that the flow is continuous through it or simply omitted in turn allowing continuous flow through R5, a pressure control valve, (20-40 psi), manufactured by Norgren Co., their Model #R06-221-NNEA. The coolant water also passes through the power transistors of the inverter, identified as Q1 and Q2, through suitable cooling jackets surrounding those devices. The return lead provides for return of the cooling water back to the main supply after it has passed through the transformer winding-smoke generating coil surrounding the tube.

Although not shown in any figure, provision is made in the tube to allow for safe elimination of any liquid smoke which may collect on the inside of the tube if an excessive amount of the liquid builds up. The drain liquid passes out the drain port (identified as "Drain" in FIG. 4) and is deposited in a safety basin or other collecting device.

The timer 20 of FIG. 1 as noted in various points above, can be one basic timing device such as Model #335 manufactured by The Eagle Signal Corporation or successive timing devices which control the following functions and activate the succeeding cycle: time cycle #1 activated by hitting the start switch 22 which controls the time it takes for the smoke generator to be brought to operating temperature; time cycle #2, controlling the actual period of time that the liquid smoke travels through the system; and, time cycle #3, controlling the water purge of the valve and nozzle at the completion of the smoke cycle, and also connected to the inverter section of the power module to allow for continued powering of the induction coil to vaporize any remaining liquid smoke on the inside wall of the induction tube and to vaporize the water after the water purge. Also, during this last time cycle the self-cleaning ability of the present system is effected.

In summary, what is provided is an apparatus and method for producing gaseous smoke from liquid smoke by the application of R.F. power to an induction coil. The latter uniformly heats a steel cylinder to approximately 1,250 degrees fahrenheit in approximately 15 seconds. When the tube reaches that temperature, the atomizing nozzle at the one end of the tube sprays the liquid smoke/water mixture against the heated inner walls causing the liquid smoke to be almost instantly changed from the liquid or mist stage to a gaseous one. This smoke is then injected or conducted to a process hot house by means of the boost air.

Modifications to the above described embodiment will be apparent to those skilled in this art. Obviously, it is to be understood that the breadth of the present invention is not limited to the disclosed embodiment, but rather is to be only restricted by the scope of the appended claims.

What is claimed is:

1. An apparatus for generating smoke in a gaseous state comprising:

a source of liquid smoke;
   means for mixing the liquid smoke with water in a predetermined ratio;
   a stationary, non-rotatable, heatable hollow member;
   inductive heating means including inductive coil means disposed around said heatable hollow member; and
   means for injecting the water/liquid smoke mixture into the interior of said heatable hollow member,
   said heatable hollow member raised to a sufficiently high temperature by said inductive heating means,
   whereby said injected water/liquid smoke mixture is vaporized into a gaseous smoke state when it contacts the wall of said heatable hollow member.

2. The apparatus claimed in claim 1 further comprising means for controlling the amount of liquid smoke per unit of time flowing from said source to said mixing means.

3. The apparatus claimed in claims 1 or 2 further comprising means for injecting air into the interior of said heatable hollow member for carrying the gaseous smoke away from said heatable hollow member for subsequent use in smoke treating food products and the like.

4. The apparatus claimed in claim 3 wherein said inductive heating means raises the temperature of said heatable hollow member to point whereat said heatable member self cleans itself.

5. The apparatus claimed in claims 1, 2, or 4 wherein said heatable hollow member is a steel cylinder.

6. A method for smoke treating food products and the like comprising the steps of:

mixing liquid smoke with water in a predetermined ratio;
   inductively heating a stationary, non rotatable hollow member to a predetermined, elevated temperature;
   injecting said liquid smoke/water mixture into the interior of said heated tube, whereby said injected water/liquid smoke mixture is vaporized into a gaseous smoke state when it contacts the wall of said heatable tube; and
   exposing the food products to the gaseous smoke.

7. The method of claim 6 further comprising the step of regulating the flow of liquid smoke per unit of time to be mixed with water.

8. The method of either claims 6 or 7, further comprising the step of injecting air into the interior of said heatable tube for carrying the gaseous smoke away from the heatable tube and to the chamber for exposing the food products thereto.

* * * * *